United States Patent
Iguchi

(10) Patent No.: US 12,520,060 B2
(45) Date of Patent: Jan. 6, 2026

(54) PHOTOELECTRIC CONVERSION DEVICE

(71) Applicant: CANON KABUSHIKI KAISHA, Tokyo (JP)

(72) Inventor: Masayuki Iguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 18/508,592

(22) Filed: Nov. 14, 2023

(65) Prior Publication Data

US 2024/0179431 A1 May 30, 2024

(30) Foreign Application Priority Data

Nov. 29, 2022 (JP) .................... 2022-189899

(51) Int. Cl.
*H04N 25/709* (2023.01)
*B60W 30/09* (2012.01)
*H04N 25/47* (2023.01)

(52) U.S. Cl.
CPC .......... *H04N 25/709* (2023.01); *H04N 25/47* (2023.01); *B60W 30/09* (2013.01); *B60W 2420/403* (2013.01)

(58) Field of Classification Search
CPC ...... H04N 25/709; H04N 25/47; H04N 25/00; H04N 25/773; B60W 30/09; B60W 2420/403
See application file for complete search history.

(56) References Cited

U.S. PATENT DOCUMENTS

| | | | | |
|---|---|---|---|---|
| 9,112,355 B2 * | 8/2015 | Makino | ................ | H04N 25/77 |
| 2016/0203610 A1 * | 7/2016 | Lee | ................ | G06V 40/16 |
| | | | | 382/103 |
| 2023/0362503 A1 * | 11/2023 | Muto | ................ | H04N 25/47 |

FOREIGN PATENT DOCUMENTS

| | | |
|---|---|---|
| JP | 2007-96601 A | 4/2007 |
| JP | 2008-167029 A | 7/2008 |
| JP | 2021-27485 A | 2/2021 |
| JP | 2021-34844 A | 3/2021 |
| JP | 2021-68950 A | 4/2021 |

* cited by examiner

*Primary Examiner* — Michael E Teitelbaum
(74) *Attorney, Agent, or Firm* — VENABLE LLP

(57) ABSTRACT

A photoelectric conversion device includes: a pixel array including pixel circuits arranged in rows and columns, each of the pixel circuits being configured to output a pixel signal based on incident light; first and second processing circuits each including a data processing unit configured to process the pixel signal to generate data; an output pad; an output circuit configured to output the data to the outside of the photoelectric conversion device via the output pad; an event signal generation unit configured to generate an event signal indicating an occurrence of an event; and a first power supply control unit. The first power supply control unit controls a first power supply control target circuit of the first processing circuit to be set to any one of states including a first state and a second state in which power consumption is higher than the first state based on the event signal.

17 Claims, 10 Drawing Sheets

PHOTOELECTRIC CONVERSION DEVICE

BACKGROUND OF THE INVENTION

Field of the Invention

The present disclosure relates to a photoelectric conversion device.

Description of the Related Art

There is a demand for reduction of power consumption in photoelectric conversion devices. Japanese Patent Application Laid-Open No. 2008-167029 discloses a photoelectric conversion device having a function of stopping power supply to an imaging element when a duration of a still state exceeds a predetermined time in a photographing mode in which moving image is captured. Japanese Patent Application Laid-Open No. 2021-027485 discloses a photoelectric conversion device whose operation mode transitions from a detection mode in which pixel signals of a plurality of pixels are added and read out to a normal mode in which respective pixel signals of a plurality of pixels are read out when it is determined that an object has changed.

A photoelectric conversion device capable of detecting occurrence of an event may include a processing circuit for processing signals from a pixel array. In this case, a reduction in power consumption in the processing circuit may be a problem.

SUMMARY OF THE INVENTION

It is an object of the present disclosure to provide a photoelectric conversion device capable of appropriately reducing power consumption in a processing circuit.

According to a disclosure of the present specification, there is provided a photoelectric conversion device including: a pixel array including a plurality of pixel circuits arranged in a plurality of rows and a plurality of columns, each of the plurality of pixel circuits being configured to output a pixel signal based on incident light; a first processing circuit and a second processing circuit each including a data processing unit configured to process the pixel signal to generate data; an output pad; an output circuit configured to output the data to the outside of the photoelectric conversion device via the output pad; an event signal generation unit configured to generate an event signal indicating an occurrence of an event based on the pixel signal; and a first power supply control unit. Each of the first processing circuit and the second processing circuit includes a first power supply control target circuit. The first power supply control unit controls the first power supply control target circuit of the first processing circuit to be set to any one of a plurality of states including a first state and a second state in which power consumption is higher than the first state based on the event signal.

According to a disclosure of the present specification, there is provided a photoelectric conversion device including: a pixel array including a plurality of pixel circuits arranged in a plurality of rows and a plurality of columns, each of the plurality of pixel circuits being configured to output a pixel signal based on incident light; a first processing circuit and a second processing circuit each including a data processing unit configured to process the pixel signal to generate data; an output pad; an output circuit configured to output the data to the outside of the photoelectric conversion device via the output pad; an event signal generation unit configured to generate an event signal indicating an occurrence of an event based on an elapsed time; and a first power supply control unit. Each of the first processing circuit and the second processing circuit includes a first power supply control target circuit. The first power supply control unit controls the first power supply control target circuit of the first processing circuit to be set to any one of a plurality of states including a first state and a second state in which power consumption is higher than the first state based on the event signal.

Further features of the present invention will become apparent from the following description of exemplary embodiments with reference to the attached drawings.

DESCRIPTION OF THE EMBODIMENTS

Figure 1:
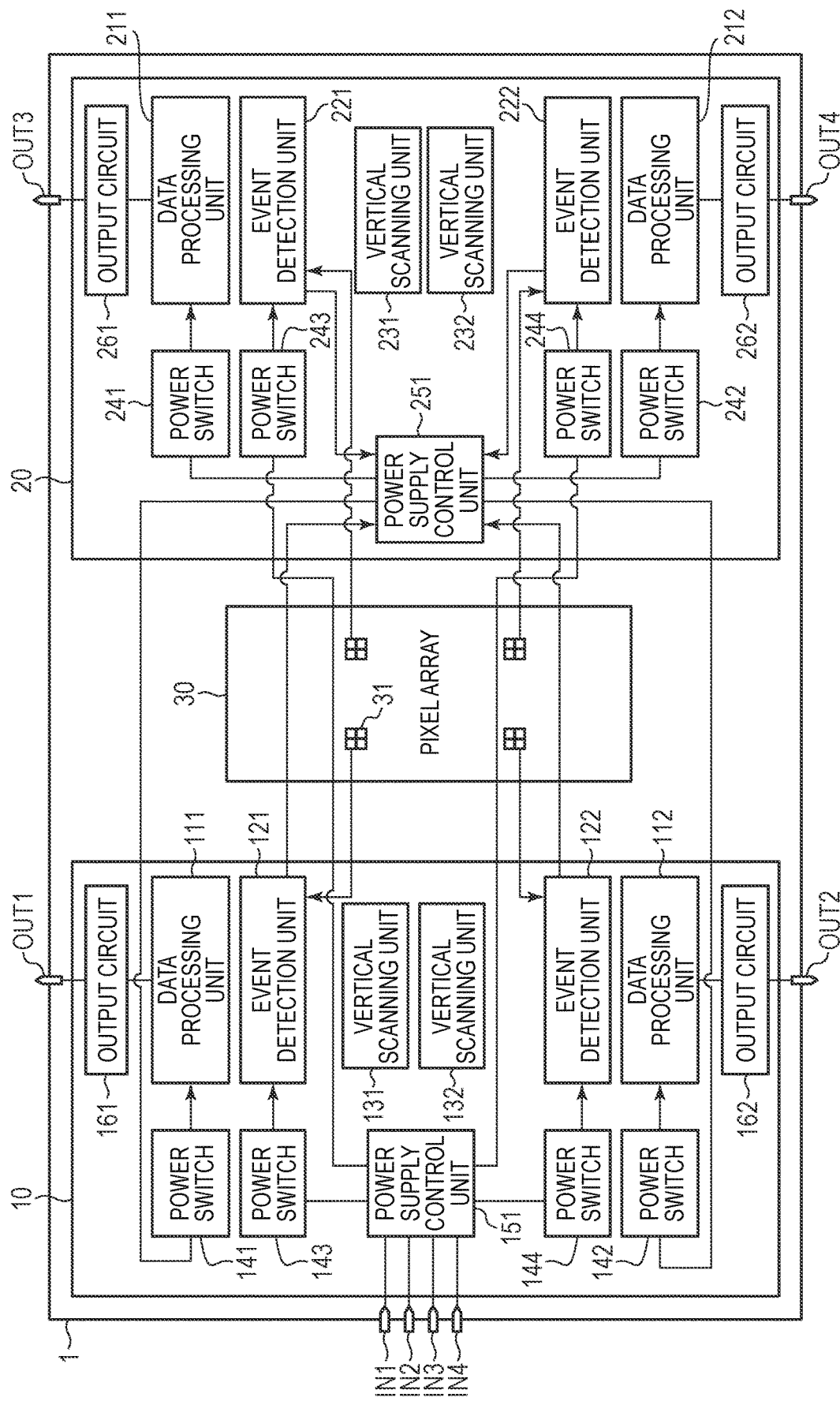
FIG. 1 is a block diagram illustrating an overall configuration of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

In a first embodiment and a second embodiment described below, as an example of a photoelectric conversion device, an event-based sensor that outputs information indicating coordinates of a pixel and time at which a luminance change occurs will be mainly described. However, the photoelectric conversion device in each embodiment is not limited to the above-described event-based sensor as long as it can detect an event signal indicating the occurrence of an event.

First Embodiment

FIG. 1 is a block diagram illustrating an overall configuration of a photoelectric conversion device 1 according to the present embodiment. The photoelectric conversion device 1 includes a pixel array 30 and processing circuits 10 and 20. The photoelectric conversion device 1 includes input terminals IN1, IN2, IN3, and IN4 and output terminals OUT1, OUT2, OUT3, and OUT4. Each of the input terminals IN1, IN2, IN3, and IN4 may be an input pad for inputting a control signal for power supply control from the outside of the photoelectric conversion device 1. Each of the output terminals OUT1, OUT2, OUT3, and OUT4 may be an output pad for outputting data to the outside of the photoelectric conversion device 1.

The processing circuit 10 (second processing circuit) includes data processing units 111 and 112, event detection units 121 and 122, vertical scanning units 131 and 132, power switches 141, 142, 143, and 144, a power supply control unit 151, and output circuits 161 and 162. The processing circuit 20 (first processing circuit) includes data processing units 211 and 212, event detection units 221 and 222, vertical scanning units 231 and 232, power switches 241, 242, 243, and 244, a power supply control unit 251, and output circuits 261 and 262. Each of the processing circuit 10 and the processing circuit 20 is a signal processing circuit that processes a signal output from the pixel array 30 to generate digital data.

As described above, the processing circuit 10 and the processing circuit 20 include circuit blocks having the same kind of functions as each other. Therefore, the processing circuit 10 and the processing circuit 20 may be formed in the same semiconductor substrate by a manufacturing method including an exposure process using a common photomask. Thus, the number of photomasks may be reduced. In this case, the processing circuit 10 and the processing circuit 20 may be referred to as two exposure regions in which exposures are performed using the same photomask. Such a manufacturing method of the photoelectric conversion device 1 is a method in which a region of one device is divided into a plurality of exposure regions and each exposure region is individually exposed, and thus may be referred to as a divisional exposure method. When the processing circuit 10 and the processing circuit 20 are formed by the divisional exposure method, semiconductor elements included in the processing circuit 10 and semiconductor elements included in the processing circuit 20 have the same layout in plan view.

Power supply control processing of the present embodiment includes transmission and reception of signals between the processing circuit 10 and the processing circuit 20. Therefore, the semiconductor elements included in the processing circuit 10 and the semiconductor elements included in the processing circuit 20 can be electrically connected to each other by wirings provided in a wiring layer. An exposure for patterning the wiring layer is sometimes called a stitching exposure. Note that a pattern of a photomask used for the stitching exposure is not the same between the region of the processing circuit 10 and the region of the processing circuit 20. Therefore, in at least one of a plurality of wiring layers, the wirings in the region of the processing circuit 10 and the wirings in the region of the processing circuit 20 have different layouts. Thus, the processing circuit 10 and the processing circuit 20 may perform different operations. In FIG. 1, lines connecting the blocks indicate a connection relationship of wirings formed by the stitching exposure.

The divisional exposure method is effective in manufacturing a photoelectric conversion device having a large light receiving region such as 35 mm full size. In the following description, the processing circuit 10 and the processing circuit 20 of the photoelectric conversion device 1 are manufactured by the divisional exposure method, but the manufacturing method is not limited thereto.

The pixel array 30 can be, for example, a single photon avalanche diode (SPAD) sensor or a complementary metal oxide semiconductor (CMOS) sensor. The CMOS sensor may include an analog-to-digital conversion (ADC) circuit. The pixel array 30 includes a plurality of pixel circuits 31 arranged in a plurality of rows and a plurality of columns. Each of the plurality of pixel circuits 31 outputs a pixel signal based on incident light.

The pixel array 30 may be arranged in a semiconductor substrate different from a semiconductor substrate in which the processing circuit 10 and the processing circuit 20 are arranged, or may be arranged in the same semiconductor substrate. When the pixel array 30 is arranged in the semiconductor substrate different from the semiconductor substrate in which the processing circuit 10 and the processing circuit 20 are arranged, the two substrates may be stacked on each other. Since the occupied area of the pixel array 30 can be increased, this configuration is effective in increasing the size of the light receiving region of the photoelectric conversion device 1.

In pixel circuits 31 of the pixel array 30, color filters of a predetermined color arrangement may be disposed. In the following description, it is assumed that the color arrangement of the color filters is a Bayer arrangement. That is, the plurality of pixel circuits 31 may include pixel circuits 31 having sensitivity to light of red (R), green (Gr, Gb), and blue (B), respectively. These pixel circuits 31 may be referred to as a pixel R, a pixel Gr (a green pixel adjacent to the right of the pixel R), a pixel B, and a pixel Gb (a green pixel adjacent to the left of the pixel B).

Next, the internal circuits of the processing circuits 10 and 20 will be described in detail. Each of the data processing units 111, 112, 211, and 212 is a circuit that receives digital data from the pixel array 30 and performs image processing.

The data processing unit 111 processes the digital data output from the pixel R and the pixel B arranged in the left half of the pixel array 30. The data processing unit 112 processes the digital data output from the pixel Gr and the pixel Gb arranged in the left half of the pixel array 30. The data processing unit 211 processes the digital data output from the pixel R and the pixel B arranged in the right half of the pixel array 30. The data processing unit 212 processes the digital data output from the pixel Gr and the pixel Gb arranged in the right half of the pixel array 30.

The pixel circuit 31 arranged in the right half of the pixel array 30 may be referred to as a first pixel circuit, and the pixel circuit 31 arranged in the left half of the pixel array 30 may be referred to as a second pixel circuit. Note that the correspondence relationship between the data processing units 111, 112, 211, and 212 and the pixel circuits 31 is not limited thereto.

The output circuits 161, 162, 261, and 262 are arranged corresponding to the data processing units 111, 112, 211, and 212, respectively. The output circuits 161, 162, 261, and 262 output the signals processed in the data processing units 111, 112, 211, and 212 to the outside of the photoelectric conversion device 1 through the output terminals OUT1, OUT2, OUT3, and OUT4, respectively. Note that the number of the output circuits 161, 162, 261, and 262 and the number of the output terminals OUT1, OUT2, OUT3, and OUT4 are not limited to those illustrated. For example, the signals processed in the data processing unit 111, 112, 211, and 212 may be collectively output from one output circuit.

The vertical scanning units 131, 132, 231, and 232 are circuits for controlling the timings of reading digital data from the pixel array 30 to the data processing units 111, 112, 211, and 212, respectively.

Each of the event detection units 121, 122, 221, and 222 (event signal generation unit) is a circuit that detects a predetermined event based on the digital data output from the pixel array 30. The event detection units 121, 122, 221, and 222 transmit control signals indicating a power shutoff request or a power recovery request of the data processing units 111, 112, 211, and 212 to the power supply control unit 251 based on the detected event, respectively. This control signal can also be referred to as an event signal indicating the occurrence of an event. The event detection processing and the determination processing in the present embodiment will be described later.

The power switches 141, 142, 241, and 242 are arranged corresponding to the data processing units 111, 112, 211, and 212, respectively. The power switches 143, 144, 243, and 244 are arranged corresponding to the event detection units 121, 122, 221, and 222, respectively. The power switches 141, 142, 241, and 242 control presence or absence of power supply to the data processing units 111, 112, 211, and 212 (first power supply control target circuit) based on control signals from the power supply control unit 251 (first power supply control unit). The power switches 143, 144, 243, and 244 controls presence or absence of power supply to the event detection units 121, 122, 221, and 222 (second power supply control target circuit) based on control signals from the power supply control unit 151 (second power supply control unit).

A control signal indicating a power shutoff request or a power recovery request is input to the power supply control unit 151 (second power supply control unit) from the outside via each of the input terminals IN1, IN2, IN3, and IN4. The power supply control unit 151 controls the power switches 143, 144, 243, and 244 to be turned on or off in accordance with these control signals. Accordingly, each of the event detection units 121, 122, 221, and 222 is controlled to either a first state in which power supply is shut off or a second state in which power is supplied. The first state is not limited to a state in which power supply is completely shut off. That is, each of the event detection units 121, 122, 221, and 222 may be operable in any of a plurality of states including a first state and a second state in which power consumption is higher than that of the first state.

A control signal indicating a power shutoff request or a power recovery request is input from each of the event detection units 121, 122, 221, and 222 to the power supply control unit 251. The power supply control unit 251 controls the power switches 141, 142, 241, and 242 to be turned on or off in accordance with these control signals. Accordingly, each of the data processing units 111, 112, 211, and 212 is controlled to either a first state in which power supply is shut off or a second state in which power is supplied. As described above, the first state is not limited to a state in which power supply is completely shut off. That is, each of the data processing units 111, 112, 211, and 212 may be operable in any of a plurality of states including a first state and a second state in which power consumption is higher than that of the first state.

Although FIG. 1 illustrates an example in which one power switch is arranged corresponding to one power supply control target circuit, a plurality of power switches may be arranged corresponding to one power supply control target circuit. In this case, effects such as suppression of voltage drop and suppression of inflow of inrush current are obtained.

The control targets of the power supply control unit 151 and the power supply control unit 251 may be opposite to those in the above example. That is, the power supply control unit 251 may control supply of power to the event detection units 121, 122, 221, and 222 based on control signals from the outside. In addition, the power supply control unit 151 may control supply of power to the data processing units 111, 112, 211, and 212 based on control signals from the event detection units 121, 122, 221, and 222, respectively. Further, the processing circuits in which the power supply control unit 151 and the power supply control unit 251 are arranged may be opposite to those in the example of FIG. 1. In other words, the power supply control unit 251 is arranged in one of the processing circuit 10 and the processing circuit 20, and the power supply control unit 151 is arranged in the other of the processing circuit 10 and the processing circuit 20.

Next, event detection processing and determination processing performed by the event detection units 121, 122, 221, and 222 will be described.

In the present embodiment, the event detected by each of the event detection units 121, 122, 221, and 222 is a change in the count value of the number of photons incident on the pixel circuit 31. The change in the count value of the number of photons indicates a change in an image, for example, a movement of an object existing in the image. Thus, each of the event detection units 121, 122, 221, and 222 determines whether or not the change in the image is greater than a threshold value. When the change in the image is large, the data processing units 111, 112, 211, and 212 performs data processing. In order to execute the data processing, the event detection units 121, 122, 221, and 222 output control signals for shutting off the power supply or recovering the power supply of the data processing units 111, 112, 211, and 212 to the power supply control unit 251 in accordance with a change in the count value, respectively.

In the example of FIG. 1, each of the processing circuits 10 and 20 includes two event detection units. It is assumed that the pixel circuits 31 from which the event detection units 121, 122, 221, and 222 receives the count values of the number of photons correspond to the pixel circuits 31 that are sources of digital data processed by the data processing units 111, 112, 211, and 212, respectively. That is, for example, the event detection unit 121 detects a change in the count value of the number of photons incident on the pixel R and the pixel B arranged in the left half of the pixel array 30. When any of the event detection units 121, 122, 221, and 222 detects that the change in the image is greater than the threshold value, the same power supply control is performed on all of the data processing units 111, 112, 211, and 212.

Figure 2:
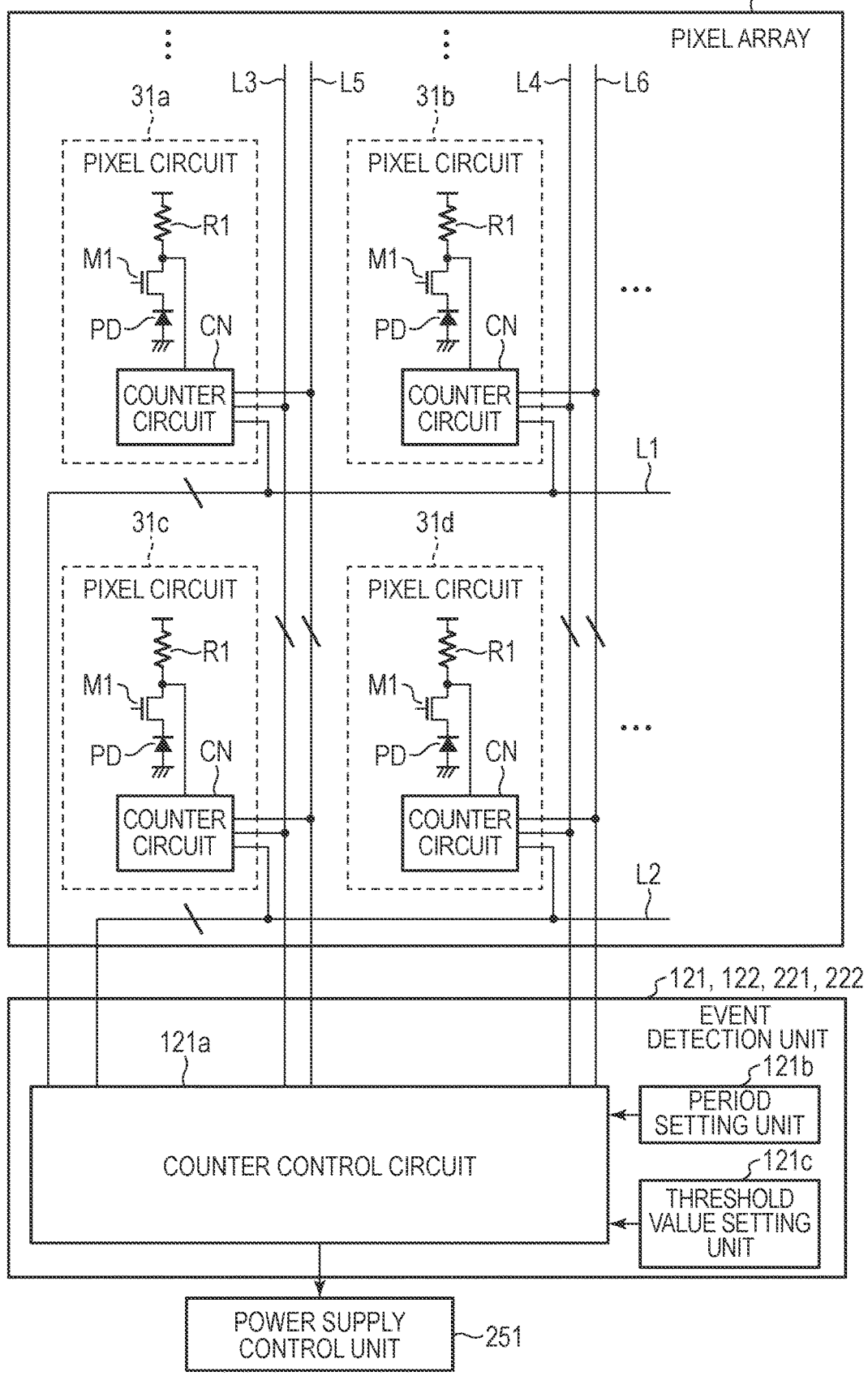
FIG. 2 is a circuit diagram illustrating a configuration of a pixel array and an event detection unit of the photoelectric conversion device according to the first embodiment.

FIG. 2 is a circuit diagram illustrating the configuration of the pixel array 30 and the event detection units 121, 122, 221, and 222 of the photoelectric conversion device 1 according to the first embodiment. The configuration of the pixel array 30 and the event detection processing in the event detection units 121, 122, 221, and 222 will be described with reference to FIG. 2. FIG. 2 illustrates four pixel circuits 31a, 31b, 31c and 31d arranged in two rows and two columns among a large number of pixel circuits 31 in the pixel array 30. FIG. 2 representatively illustrates one functional block of the event detection units 121, 122, 221, and 222. Each of the event detection units 121, 122, 221, and 222 includes a counter control circuit 121a, a period setting unit 121b, and a threshold value setting unit 121c.

The pixel circuit 31a includes a photoelectric conversion element PD, a transistor M1, a resistive element R1, and a counter circuit CN. Although the other pixel circuits 31b, 31c, and 31d have the same configuration, the following description focuses on the pixel circuit 31a.

The photoelectric conversion element PD is an element that generates charges by photoelectric conversion according to incident light, and is, for example, an avalanche photodiode. Hereinafter, the photoelectric conversion element PD is assumed to be an avalanche photodiode. The anode of the photoelectric conversion element PD is connected to a ground node. The cathode of the photoelectric conversion element PD is connected to the source of the transistor M1. A drain of the transistor M1 is connected to a first terminal of the resistive element R1 and an input terminal of the counter circuit CN. A second terminal of the resistive element R1 is connected to a power supply node having a predetermined power supply potential. Thus, a predetermined reverse bias voltage can be supplied to the photoelectric conversion element PD. A reverse bias voltage that causes the photoelectric conversion element PD to perform an avalanche multiplication operation is supplied to the anode and the cathode of the photoelectric conversion element PD. In the photoelectric conversion element PD to which the reverse bias voltage is supplied, when a charge is generated by the incident light, the charge causes avalanche multiplication, and an avalanche current is generated.

The resistive element R1 functions as a load circuit (quenching circuit) when a signal is multiplied by the avalanche multiplication. The resistive element R1 suppresses the voltage supplied to the photoelectric conversion element PD and suppresses the avalanche multiplication (quenching operation). The resistive element R1 returns the voltage supplied to the photoelectric conversion element PD to the original reverse bias voltage by passing a current corresponding to the voltage drop due to the quenching operation (recharging operation).

A control signal is input to the gate of the transistor M1 from the vertical scanning unit 131, 132, 231, or 232. The transistor M1 is controlled to be on or off in accordance with the control signal. Thus, the detection timing of the incident light in the photoelectric conversion element PD is controlled.

The counter circuit CN counts a pulse of a potential change at a connection node between the drain of the transistor M1 and the first terminal of the resistive element R1, and outputs digital data. Since the potential change is based on the incidence of a photon on the photoelectric conversion element PD, the counter circuit CN can count the number of the incident photons. The counter circuit CN may include a waveform shaping circuit to facilitate counting pulses.

The pixel array 30 is provided with control signal lines L1 and L2 arranged at corresponding rows of the pixel array 30, control signal lines L3 and L4 arranged at corresponding columns of the pixel array 30, and output signal lines L5 and L6 arranged at corresponding columns of the pixel array 30. The counter control circuit 121a is connected to the control signal lines L1, L2, L3, and L4 and the output signal lines L5 and L6. Each of the control signal lines and the output signal lines is connected to the counter circuits CN of the pixel circuits of the corresponding row or column. For example, the counter circuit CN of the pixel circuit 31a is connected to the counter control circuit 121a via the control signal lines L1 and L3 and the output signal line L5.

The control signal lines L1, L2, L3, and L4 are signal lines for outputting control signals from the counter control circuit 121a to the corresponding counter circuits CN. The control signal may include, for example, a selection signal for selecting a specific counter circuit CN, a count value request signal for requesting output of the count value, a counter stop signal for instructing stop of the counting, a counter reset signal for instructing reset of the count value, and the like. Since the control signal lines L1, L2, L3, and L4 are arranged corresponding rows and columns of the pixel array 30, the counter control circuit 121a can individually control the counter circuit CN of each pixel circuit.

The output signal lines L5 and L6 are signal lines for transmitting count values from the counter circuits CN of the corresponding column to the counter control circuit 121a.

FIG. 2 illustrates an example in which one counter control circuit 121a is connected to all of the control signal lines L3 and L4 and the output signal lines L5 and L6 extending in the column direction and connected to all of the control signal lines L1 and L2 extending in the row direction. However, a plurality of counter control circuits 121a may be provided. For example, a first counter control circuit may be connected to the control signal lines L3 and L4 and the output signal lines L5 and L6 extending in the column direction, and a second counter control circuit may be connected to the control signal lines L1 and L2 extending in the row direction. In this case, since the wirings in the row direction and the wirings in the column direction are connected to different circuits, the density of the wirings is reduced.

Further, the counter control circuit 121a has a function of continuing to acquire the count values within a predetermined period and calculating and storing the sum of the count values acquired within the predetermined period. The period setting unit 121b has a function of setting a time width for acquiring the count value and supplying the setting value to the counter control circuit 121a.

The counter control circuit 121a has a function of calculating a difference value between the sum of the count values stored by the above-described processing and that of the preceding period, that is, the difference value is a difference between the sum of the count values in a certain period and the sum of the count values in a period immediately preceding the certain period. The counter control circuit 121a has a function of comparing the difference value with a threshold value to determine the magnitude of the change in the image. The threshold value setting unit 121c has a function of setting the threshold value used in this comparison and supplying the setting value to the counter control circuit 121a. Note that the difference value may be a difference between the sum of count values in a certain period and the sum of count values in a period two or more prior thereto.

With the above configuration, the counter control circuit 121a can output a control signal requesting power supply control to the power supply control unit 251 in accordance with count values selectively received from a plurality of pixel circuits. For example, in the pixel array 30 of FIG. 2, it is assumed that the pixel circuit 31a is a pixel R, the pixel circuit 31b is a pixel Gr, the pixel circuit 31c is a pixel Gb, and the pixel circuit 31d is a pixel B. In this case, the event detection unit 121 acquires count values from the pixel circuit 31a and the pixel circuit 31d arranged in the left half of the pixel array 30.

The bit widths of the control signals and the digital data transmitted and received between the blocks in FIG. 2 are not particularly limited, and may be appropriately set according to the design of the photoelectric conversion device 1.

Figure 3:
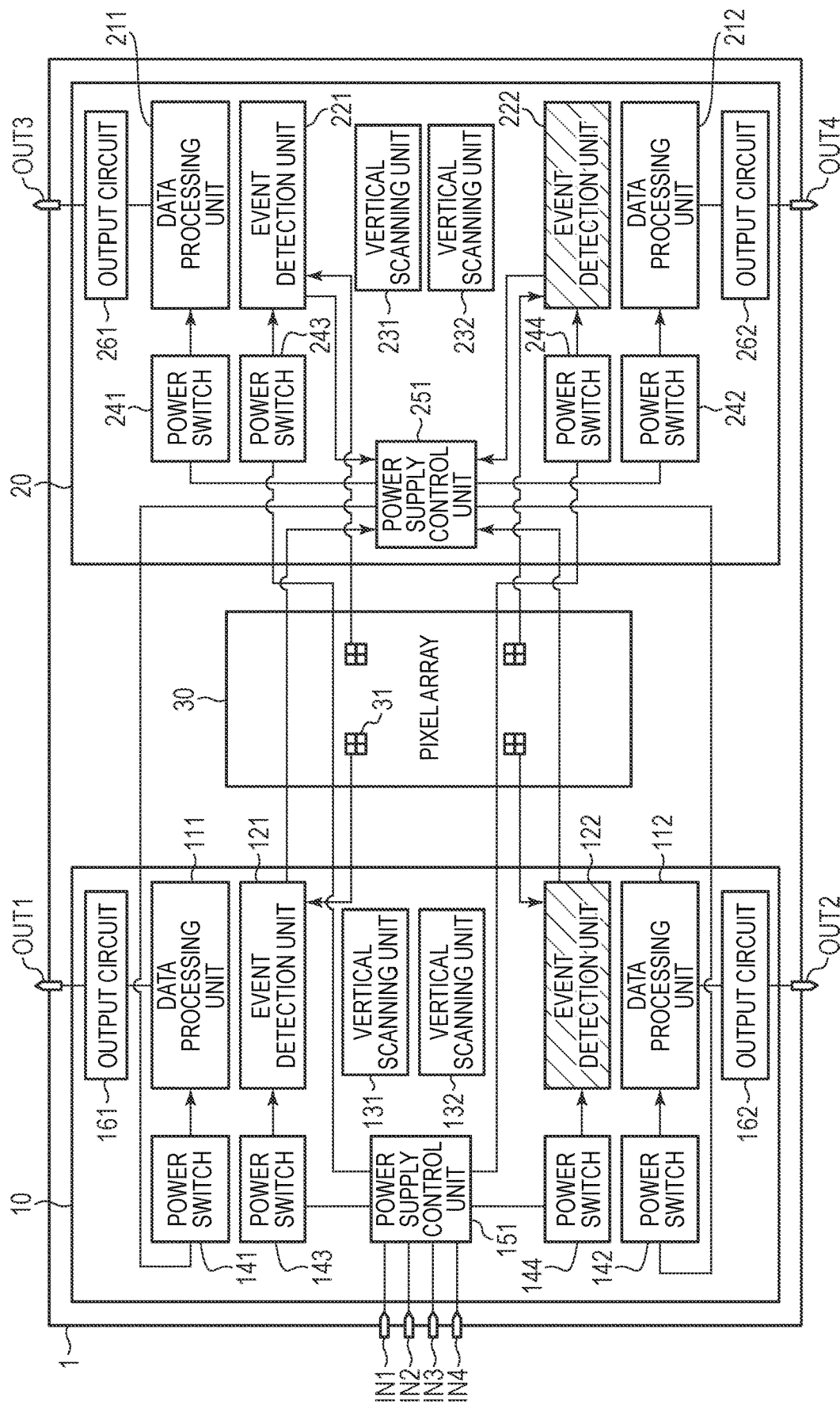
FIG. 3 is a diagram schematically illustrating an example of designation of a power shutoff target in the photoelectric conversion device according to the first embodiment.
Figure 4:
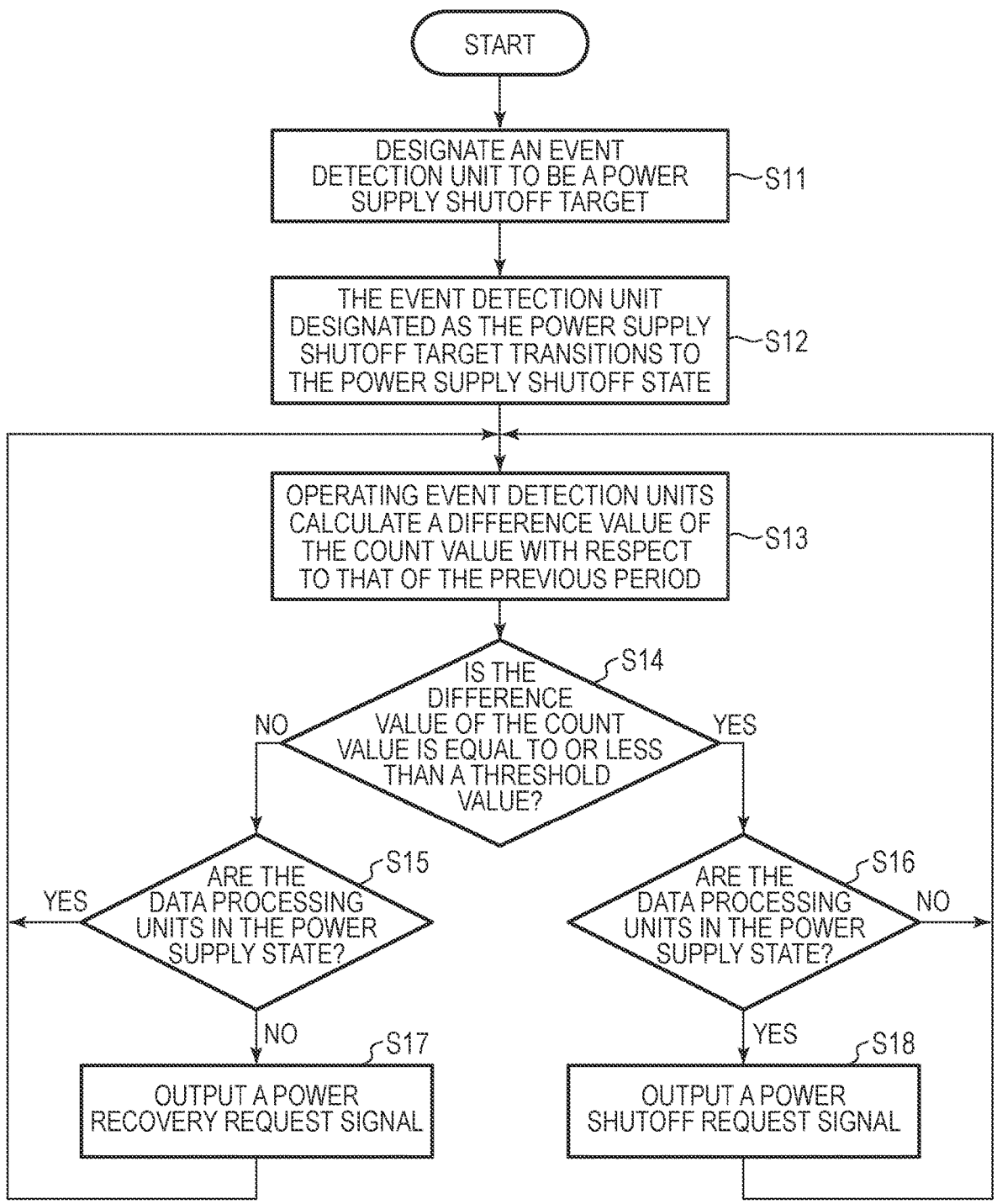
FIG. 4 is a flowchart illustrating a power supply control method of the photoelectric conversion device according to the first embodiment.

Next, with reference to FIGS. 3 and 4, power supply control processing in the present embodiment will be described. FIG. 3 is a diagram schematically illustrating an example of designation of a power shutoff target in the photoelectric conversion device 1 according to the present embodiment. FIG. 4 is a flowchart illustrating a power supply control method of the photoelectric conversion device 1 according to the present embodiment.

In step S11, the photoelectric conversion device 1 receives designation of an event detection unit to be a power supply shutoff target. One or more event detection units to be the power supply shutoff target are selected and designated from the event detection units 121, 122, 221, and 222. More specifically, a power shutoff request signal is input from an external device of the photoelectric conversion device 1 to the input terminals IN1, IN2, IN3, and IN4. The input terminals IN1, IN2, IN3, and IN4 correspond to the event detection unit 121, 122, 221, and 222, respectively, and when the input signal is at the high level, the input signal indicates a power shutoff request. For example, when the high-level signal is input to each of the input terminals IN2 and IN4, the two event detection units 122 and 222 are designated as the power supply shutoff targets.

In step S12, the event detection unit designated as the power supply shutoff target transitions to the power supply shutoff state. Specifically, the power supply control unit 151 turns off the power switch of the event detection unit in accordance with the input signal, whereby the supply of power to the event detection unit is shut off. When the high-level signal is input to each of the input terminals IN2 and IN4, the power switches 144 and 244 are controlled to be off, and the event detection units 122 and 222 illustrated by the hatched boxes in FIG. 3 are switched to the power supply shutoff state.

In step S13, operating event detection units other than the power supply shutoff target calculate the difference value of the count value with respect to that of the previous period. In the above example, the event detection units 121 and 221 operate. Accordingly, the event detection unit 121 calculates the difference value of the count value of the number of photons incident on the pixel R and the pixel B arranged in the left half of the pixel array 30. The event detection unit 221 calculates the difference value of the count values of the numbers of photons incident on the pixels R and the pixels B arranged in the right half of the pixel array 30. In the above example, the processing by the event detection unit 121 and the processing by the event detection unit 221 are independently performed in parallel.

In step S14, the operating event detection units determines whether or not the difference value of the count value is equal to or less than a threshold value. When there are a plurality of operating event detection units, each of the plurality of event detection units independently performs this determination processing. When the difference value is greater than the threshold value (NO in the step S14), it is determined that the change of the image is sufficiently large, and the process proceeds to step S15. On the other hand, when the difference value is equal to or less than the threshold value (YES in the step S14), it is determined that the change in the image is small, and the process proceeds to step S16.

When a plurality of event detection units are operating, the processing of the steps S13 and S14 are independently performed in parallel in each of the plurality of event detection units. In this case, in the step S14, when the difference value is greater than the threshold value in at least one event detection unit (NO in the step S14), it is determined that the change of the image is sufficiently large, and the process proceeds to the step S15.

In the step S15, the power supply control unit 251 determines whether or not all of the data processing units 111, 112, 211, and 212 are in the power supply state. When all of the data processing units 111, 112, 211, and 212 are in the power supply state (YES in the step S15), the process proceeds to the step S13, and the same state is maintained. When all of the data processing units 111, 112, 211, and 212 are in the power supply shutoff state (NO in the step S15), the process proceeds to step S17.

In the step S17, the power supply control unit 251 outputs the power recovery request signal to each of the power switches 141, 142, 241, and 242. The power recovery request signal is a signal for turning on each power switch to bring the data processing unit into a state in which power is supplied. As a result, the data processing units 111, 112, 211, and 212 return to the power supply state, and the process proceeds to the step S13. Note that as described above, all the data processing units 111, 112, 211, and 212 are in synchronization with each other, and transition between the power supply state and the power supply shutoff state occurs at the same time in the data processing units 111, 112, 211, and 212.

In the step S16, the power supply control unit 251 determines whether or not all of the data processing units 111, 112, 211, and 212 are in the power supply state. When all of the data processing units 111, 112, 211, and 212 are in the power supply shutoff state (NO in the step S16), the process proceeds to the step S13 and the same state is maintained. When all of the data processing units 111, 112, 211, and 212 are in the power supply state (YES in the step S16), the process proceeds to step S18.

In the step S18, the power supply control unit 251 outputs the power shutoff request signal to each of the power switches 141, 142, 241, and 242. The power shutoff request signal is a signal for turning off each power switch to bring the data processing unit into a state in which power is shut off. Thereby, the data processing unit 111, 112, 211, and 212 transitions to the power shutoff state, and the process proceeds to the step S13.

The power supply control unit 251 of the present embodiment can dynamically change the state of power supply in the power supply shutoff target circuit in the processing circuit in accordance with the detection result of the event. Therefore, according to the present embodiment, it is possible to provide the photoelectric conversion device 1 capable of more suitably reducing power consumption in the processing circuit.

Further, the power supply control unit 151 of the present embodiment can change an event to be detected according to an imaging target by changing the state of the event detection unit based on an input signal from the outside.

For example, when the photoelectric conversion device 1 according to the present embodiment is used for monitoring a state change of the horizon, an approximate state change can be detected by detecting a change in the number of photons incident on the pixel R and the pixel B. Therefore, even if the supply of power to the event detection unit corresponding to the pixel Gr and the pixel Gb is shut off, it is possible to detect the state change of the horizon without significantly lowering the accuracy.

When the photoelectric conversion device 1 according to the present embodiment is used for monitoring a state change of agricultural crops, an approximate state change can be detected by detecting a change in the number of photons incident on the pixel Gr and the pixel Gb. Therefore, even if the supply of power to the event detection unit corresponding to the pixel R and the pixel B is shut off, it is possible to detect the state change of the agricultural crops without significantly lowering the accuracy. Accordingly, by changing the event to be detected according to the imaging target in this manner, power consumption in the processing circuit can be further reduced.

Further, the configuration of the present embodiment is more effective in the case where the semiconductor elements of the processing circuit 10 and the semiconductor elements of the processing circuit 20 are designed to have the same layout by being manufactured by the divisional exposure method using the same photomask. In this design constraint, two identical power supply control units 151 and 251 are formed on a semiconductor substrate. By connecting different wirings to the power supply control units 151 and 251 by the stitching exposure, the power supply control units 151 and 251 can individually perform state control of different power supply control target circuits. Therefore, the two power supply control units 151 and 251 formed under the restriction of the divisional exposure method are effectively utilized for controlling the power supply state.

Second Embodiment

The photoelectric conversion device 1 of the present embodiment is different from that of the first embodiment in that the event detected by the event detection unit is not the change in the image but a lapse of time. Hereinafter, the configuration and operation of the photoelectric conversion device 1 of the present embodiment will be described, but a description of a portion common to the first embodiment may be omitted or simplified as appropriate.

Figure 5:
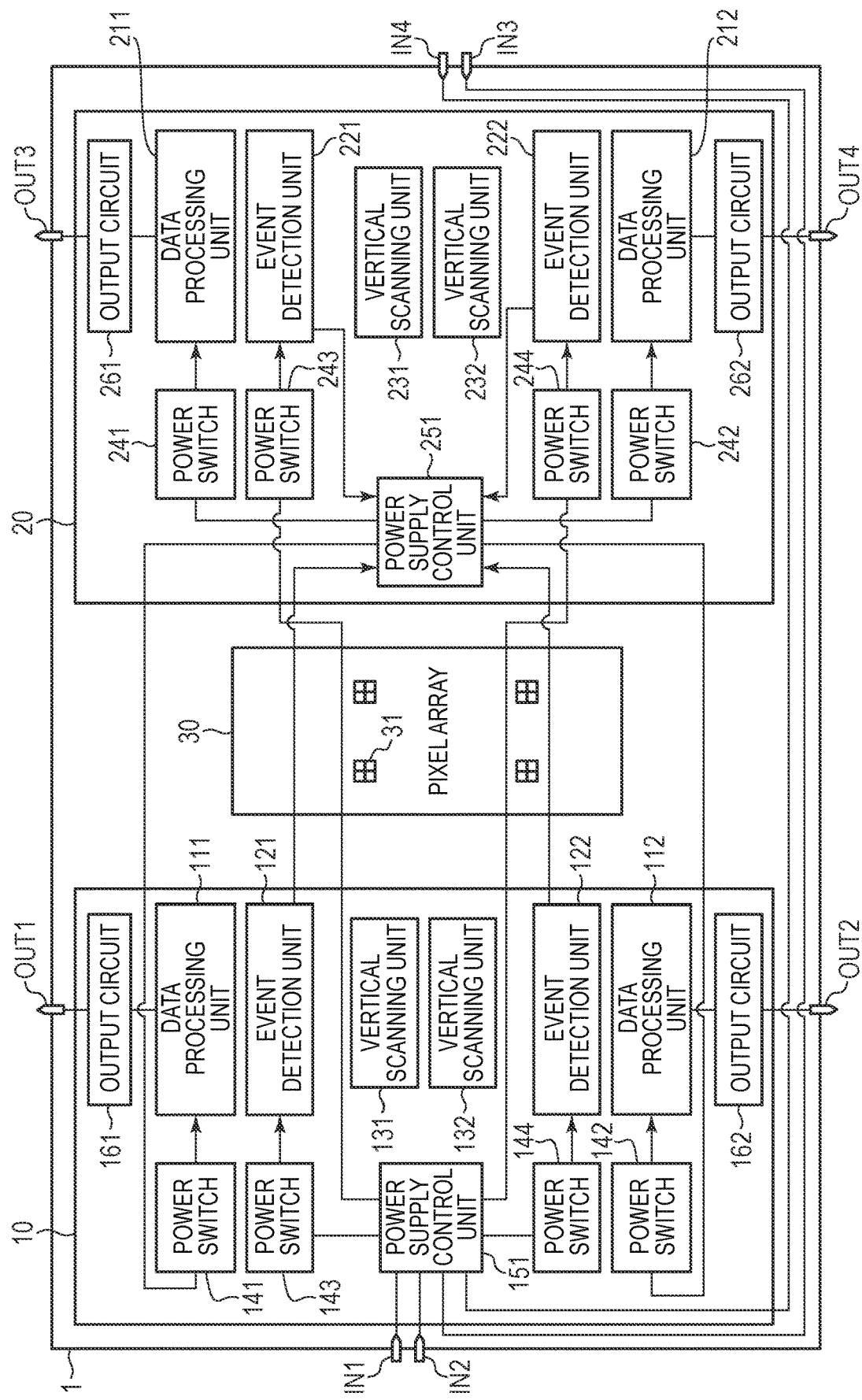
FIG. 5 is a block diagram illustrating an overall configuration of a photoelectric conversion device according to a second embodiment.

FIG. 5 is a block diagram illustrating an overall configuration of a photoelectric conversion device 1 according to the present embodiment. Blocks arranged in the photoelectric conversion device 1 are similar to those in the first embodiment. A first difference in the overall block diagram of the present embodiment from the overall block diagram of the first embodiment is that the event detection units 121, 122, 221, and 222 is not connected to the pixel array 30. In the present embodiment, since the event to be detected is the lapse of time and information of the image acquired by the pixel array 30 is not required, such a configuration is applied.

A second difference between the overall block diagram of the present embodiment and the overall block diagram of the first embodiment is an arrangement of the input terminals IN3 and IN4. In the present embodiment, the input terminals IN1 and IN2 are arranged in the vicinity of the processing circuit 10, and the input terminals IN3 and IN4 are arranged in the vicinity of the processing circuit 20. However, the positions of the input terminals IN1, IN2, IN3, and IN4 are exemplary, and are not limited to those described in the first embodiment or the second embodiment.

Figure 6:
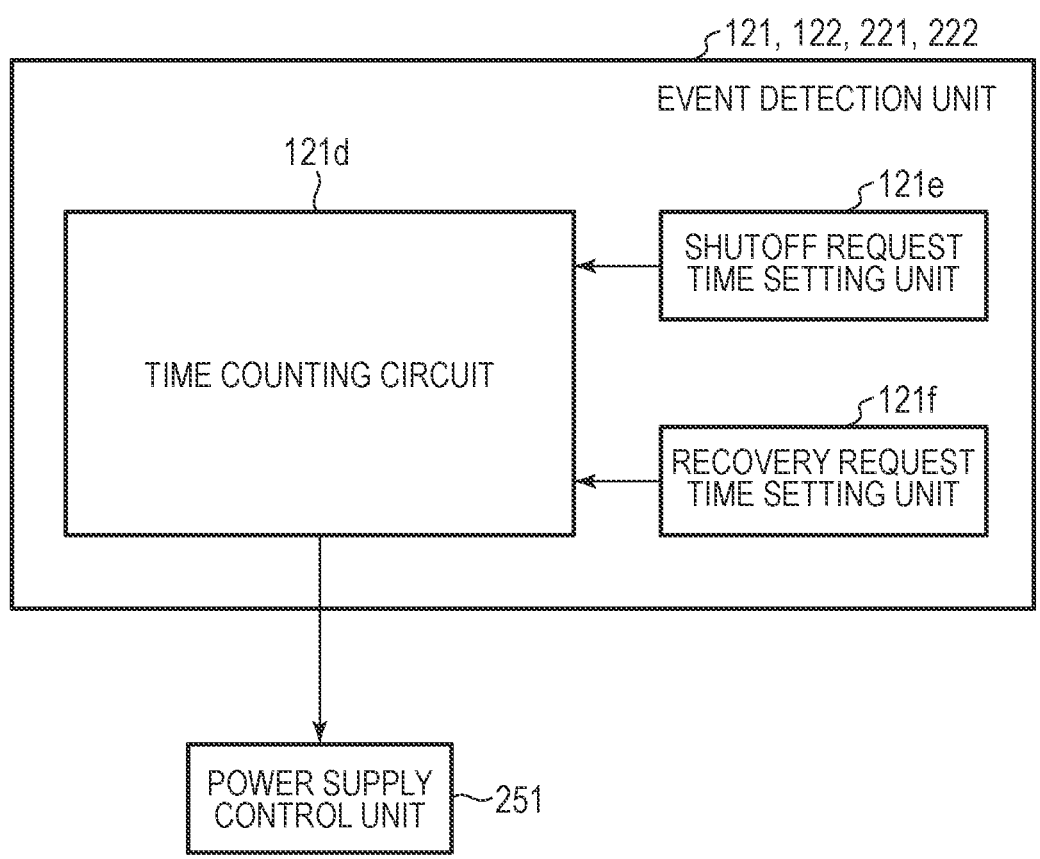
FIG. 6 is a block diagram illustrating a configuration of an event detection unit of the photoelectric conversion device according to the second embodiment.

FIG. 6 is a block diagram illustrating a configuration of the event detection units 121, 122, 221, and 222 of the photoelectric conversion device 1 according to the present embodiment. FIG. 6 representatively illustrates one of the event detection units 121, 122, 221, and 222, and illustrates functional blocks thereof. Each of the event detection units 121, 122, 221, and 222 includes a time counting circuit 121d, a shutoff request time setting unit 121e, and a recovery request time setting unit 121f.

The time counting circuit 121d is a circuit including a counter that counts an elapsed time from the reset. The shutoff request time setting unit 121e has a function of setting a time from the reset to the output of a control signal for power shutoff, and supplying the setting value to the time counting circuit 121d. The recovery request time setting unit 121f has a function of setting a time from the reset to the output of a control signal for power recovery, and supplying the setting value to the time counting circuit 121d. The reset is a processing of setting a count value indicating the elapsed time to an initial value (for example, zero).

In the initial state, the time counting circuit 121d resets the count value and then starts counting the elapsed time. When the count value reaches the setting value set by the shutoff request time setting unit 121e, a control signal requesting power shutoff is output to the power supply control unit 251 to reset the count value. After that, when the count value reaches the setting value set by the recovery request time setting unit 121f, a control signal requesting power recovery is output to the power supply control unit 251 to reset the count value. After that, when the count value reaches the setting value set by the shutoff request time setting unit 121e, a control signal requesting power shutoff is output to the power supply control unit 251 to reset the count value. Similarly, the time counting circuit 121d outputs control signals so that the power supply is repeatedly shut off and recovered every time a time that has been set elapses. The number of bits of the counter is not particularly limited as long as the number of bits of the counter is sufficient for counting up to a time corresponding to the setting value.

Figure 7:
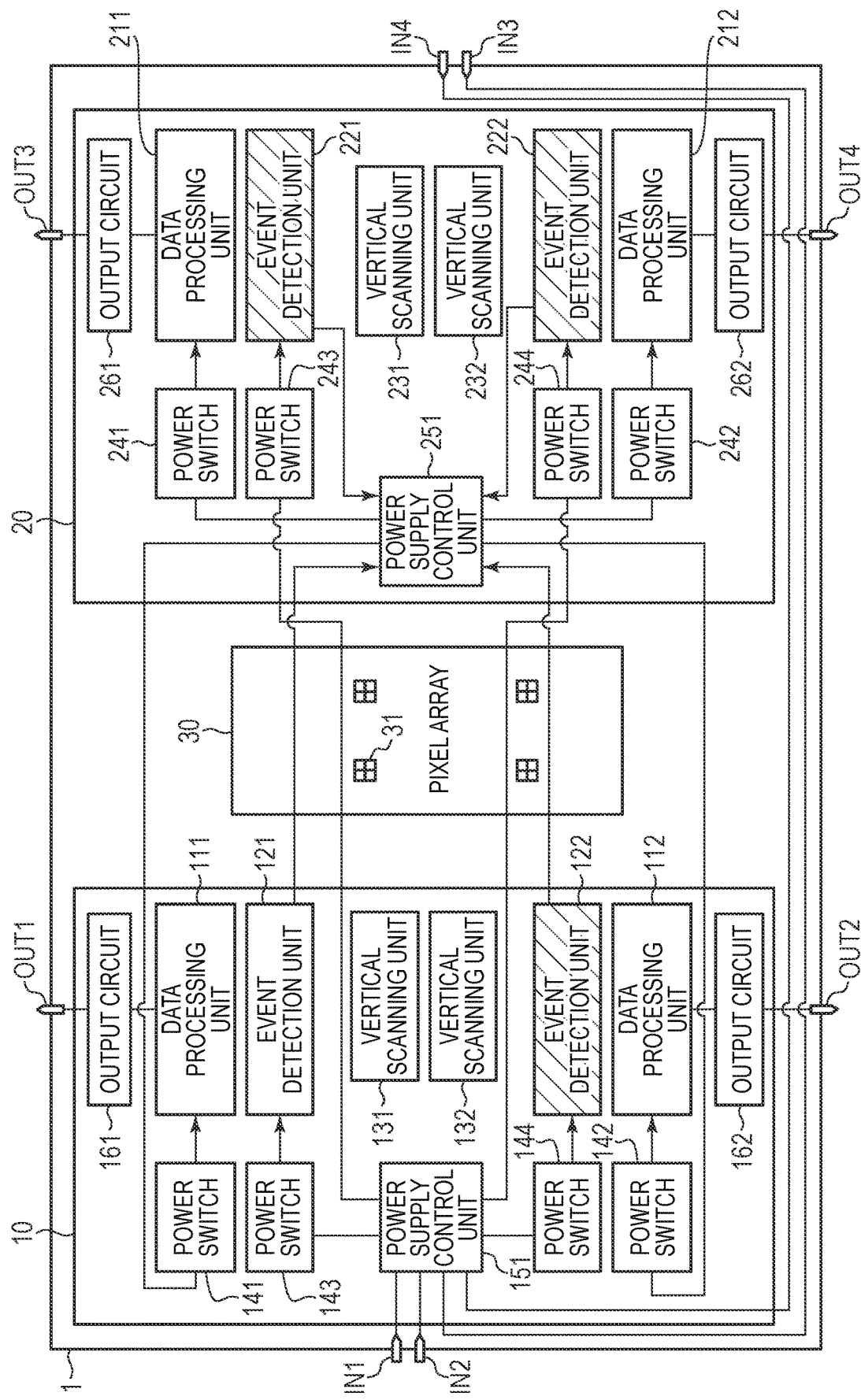
FIG. 7 is a diagram schematically illustrating an example of designation of a power shutoff target in the photoelectric conversion device according to the second embodiment.
Figure 8:
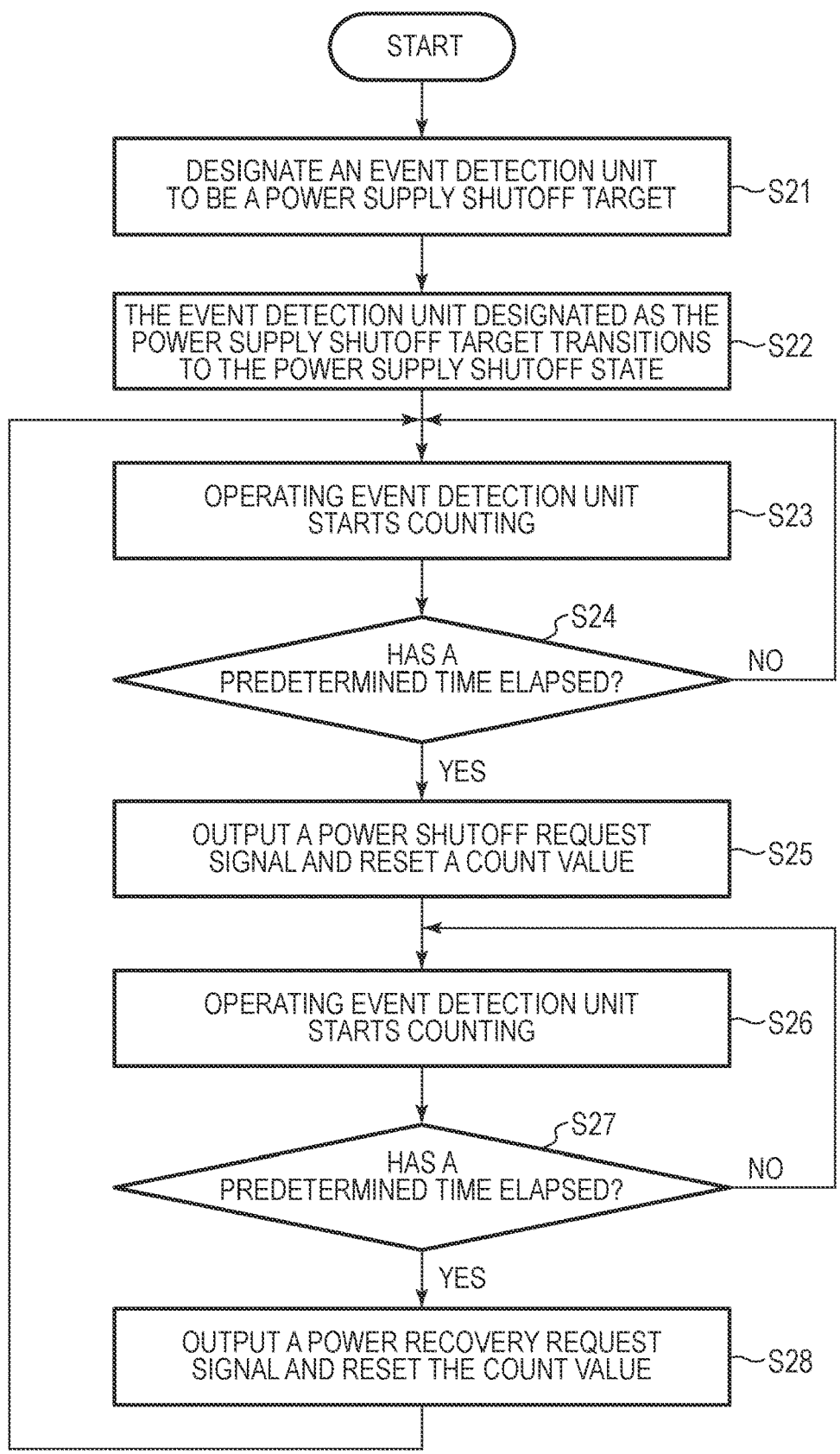
FIG. 8 is a flowchart illustrating a power supply control method of the photoelectric conversion device according to the second embodiment.

Next, with reference to FIGS. 7 and 8, power supply control processing in the present embodiment will be described. FIG. 7 is a diagram schematically illustrating an example of designation of a power shutoff target in the photoelectric conversion device 1 according to the present embodiment. FIG. 8 is a flowchart illustrating a power supply control method of the photoelectric conversion device 1 according to the present embodiment.

In step S21, the photoelectric conversion device 1 receives designation of an event detection unit to be a power supply shutoff target. One or more event detection units to be the power supply shutoff target are selected and designated from the event detection units 121, 122, 221, and 222. More specifically, a power shutoff request signal is input from an external device of the photoelectric conversion device 1 to the input terminals IN1, IN2, IN3, and IN4. The input terminals IN1, IN2, IN3, and IN4 correspond to the event detection unit 121, 122, 221 and 222, respectively, and when the input signal is at the high level, the input signal indicates a power shutoff request. For example, when the high-level signal is input to each of the input terminals IN2, IN3, and IN4, the three event detection units 122, 221, and 222 are designated as the power supply shutoff targets. Note that in this embodiment, since an event to be detected is elapsed time, and there is no particular difference in the operation of each event detection units 121, 122, 221, and 222, it is only required that any one of the event detection units can operate.

In step S22, the event detection unit designated as the power supply shutoff target transitions to the power supply shutoff state. Specifically, the power supply control unit 151 turns off the power switch of the event detection unit in accordance with the input signal, whereby the supply of power to the event detection unit is shut off. When the high-level signal is input to each of the input terminals IN2, IN3, and IN4, the power switches 144, 243, and 244 are controlled to be off, and the event detection units 122, 221, and 222 illustrated by the hatched boxes in FIG. 7 are switched to the power supply shutoff state.

In step S23, operating event detection unit other than the power supply shutoff target starts counting. In the above example, the event detection unit 121 operates. Accordingly, in this example, only the event detection unit 121 starts counting. The count value of the event detection unit 121 is reset immediately before the start of counting.

In step S24, the operating event detection unit determines whether or not the count value exceeds the setting value that has been set by the shutoff request time setting unit 121e, that is, whether or not a predetermined time has elapsed. When the predetermined time has elapsed (YES in the step S24), the process proceeds to step S25. On the other hand, when the predetermined time has not elapsed (NO in the step S24), the process proceeds to the step S23 and the counting is continued.

In the step S25, the operating event detection unit outputs a control signal requesting power shutoff to the power supply control unit 251. The power supply control unit 251 outputs a power shutoff request signal to each of the power switches 141, 142, 241, and 242. Thereby, the data processing units 111, 112, 211, and 212 transitions to the power supply shutoff state. Then, the power supply control unit 251 resets the count value. Thereafter, in step S26, the operating event detection unit starts counting.

In step S27, the operating event detection unit determines whether or not the count value exceeds the setting value that has been set by the recovery request time setting unit 121f, that is, whether or not a predetermined time has elapsed. When the predetermined time has elapsed (YES in the step S27), the process proceeds to step S28. On the other hand, when the predetermined time has not elapsed (NO in the step S27), the process proceeds to the step S26 and the counting is continued.

In the step S28, the operating event detection unit outputs a control signal requesting power recovery to the power supply control unit 251. The power supply control unit 251 outputs a power recovery request signal to the power switches 141, 142, 241, and 242. Thereby, the data processing units 111, 112, 211, and 212 returns to the power supply state. Then, the power supply control unit 251 resets the count value. After that, the process returns to the step S23, and the operating event detection unit starts counting. Thereafter, in the same manner, by the loop from the step S23 to the step S28, the power supply is shut off and recovered repeatedly every time the set time elapses.

The power supply control unit 251 of the present embodiment can dynamically change the state of power supply in the power supply shutoff target circuit in the processing circuit in accordance with the lapse of time. Therefore, according to the present embodiment, it is possible to provide the photoelectric conversion device 1 capable of more suitably reducing power consumption in the processing circuit.

Third Embodiment

Figure 9:
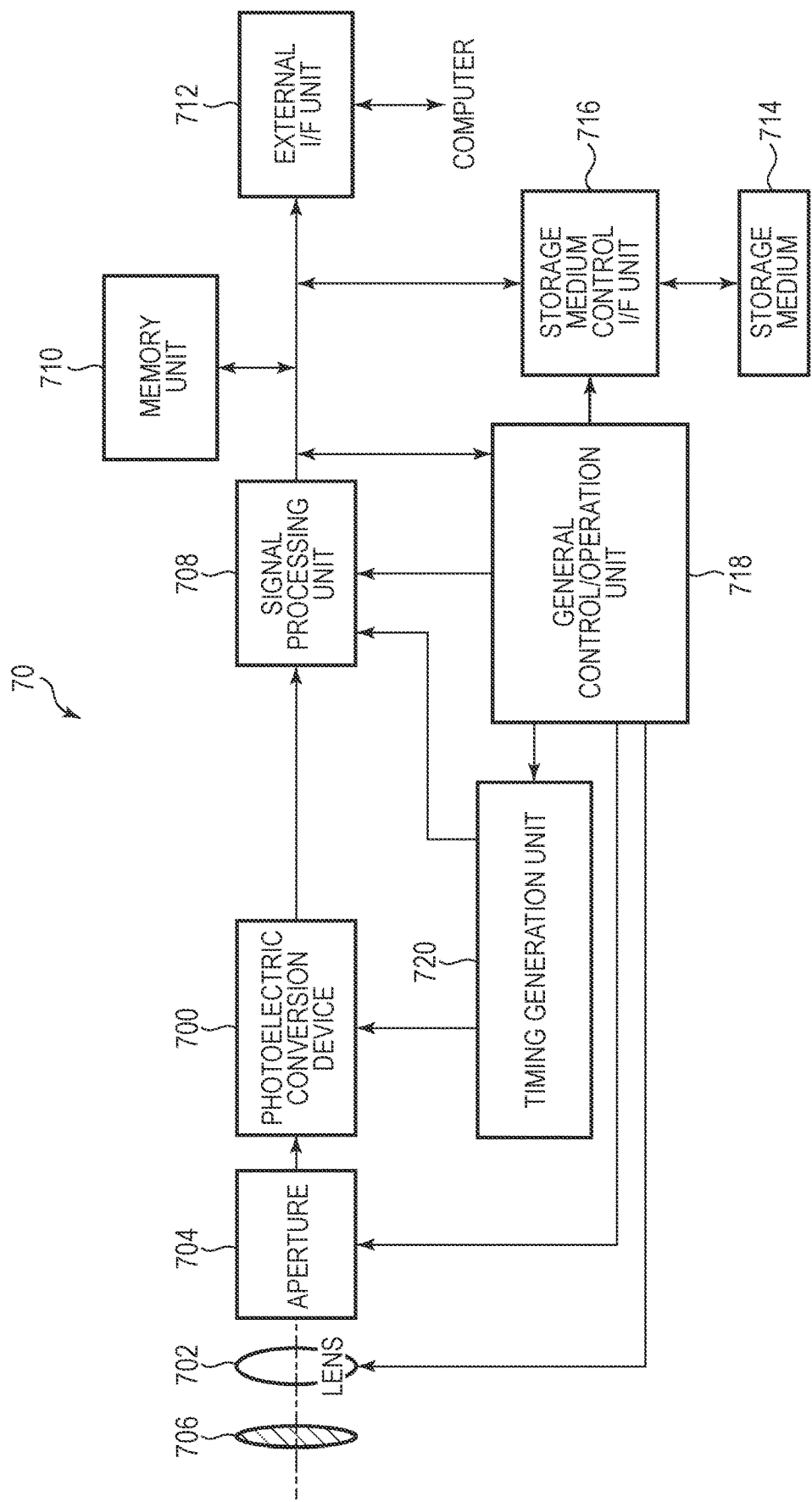
FIG. 9 is a block diagram of equipment according to a third embodiment.

The photoelectric conversion device of the above embodiments can be applied to various equipment. Examples of the equipment include a digital camera, a digital camcorder, a camera head, a copying machine, a facsimile, a mobile phone, a vehicle-mounted camera, an observation satellite, and a surveillance camera. FIG. 9 is a block diagram of a digital camera as an example of equipment.

The equipment 70 illustrated in FIG. 9 includes a barrier 706, a lens 702, an aperture 704, and a photoelectric conversion device 700. The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the photoelectric conversion device 700. The aperture 704 varies the amount of light passing through the lens 702. The photoelectric conversion device 700 is configured as in the above embodiments, and converts an optical image formed by the lens 702 into image data (image signal). The signal processing unit 708 performs various corrections, data compression, and the like on the image data output from the photoelectric conversion device 700. The timing generation unit 720 outputs various timing signals to the photoelectric conversion device 700 and the signal processing unit 708. The general control/operation unit 718 controls the entire digital camera, and the memory unit 710 temporarily stores image data. The storage medium control I/F unit 716 is an interface for storing or reading image data on the storage medium 714, and the storage medium 714 is a detachable storage medium such as a semiconductor memory for storing or reading captured image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel circuit may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the photoelectric conversion device 700 to an object.

Fourth Embodiment

Figure 10A:
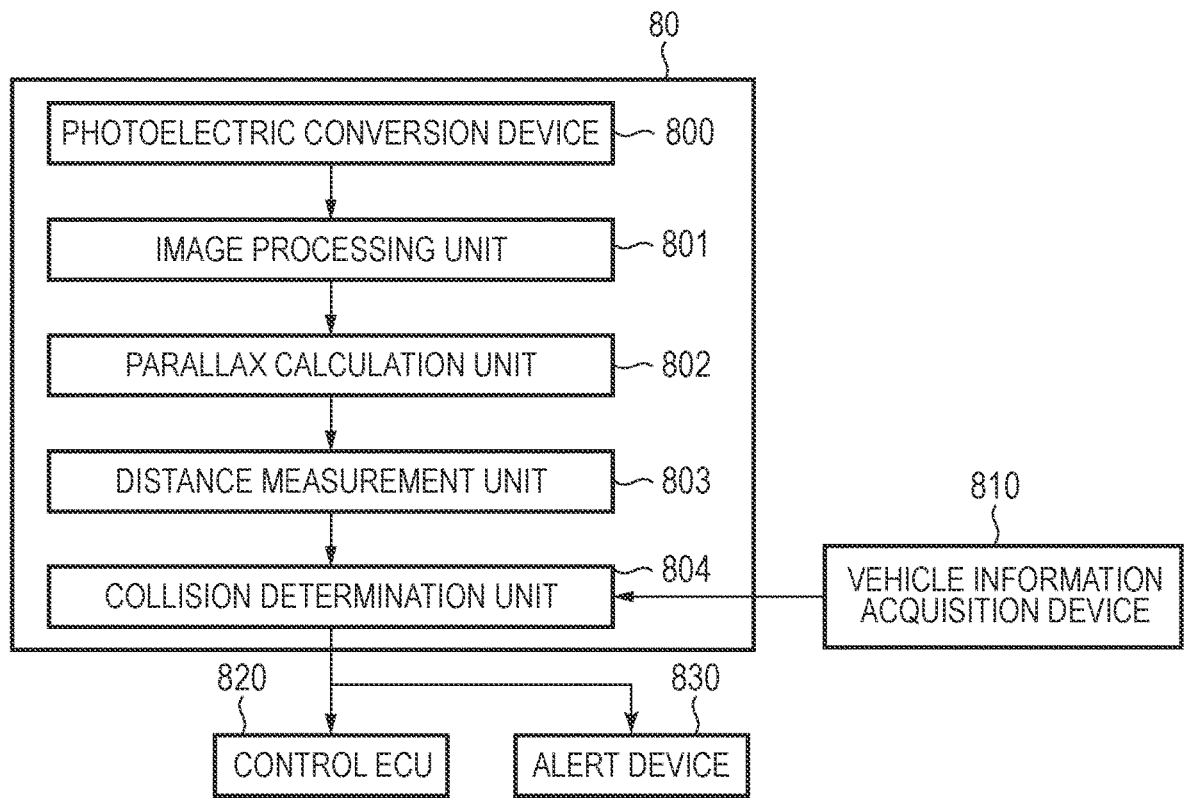
FIG. 10A and FIG. 10B are block diagrams of equipment according to a fourth embodiment.
Figure 10B:
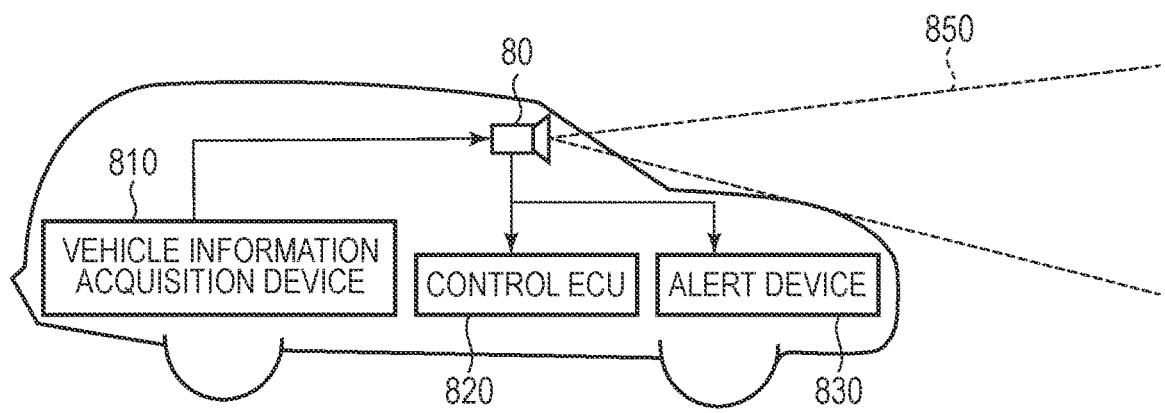

FIGS. 10A and 10B are block diagrams of equipment relating to the vehicle-mounted camera according to the present embodiment. The equipment 80 includes a photoelectric conversion device 800 of the above-described embodiments and a signal processing device (processing device) that processes a signal from the photoelectric conversion device 800. The equipment 80 includes an image processing unit 801 that performs image processing on a plurality of pieces of image data acquired by the photoelectric conversion device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 10B illustrates equipment in a case where an image is captured in front of the vehicle (image capturing range 850). The vehicle information acquisition device 810 as the imaging control unit sends an instruction to the equipment 80 or the photoelectric conversion device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-189899, filed Nov. 29, 2022 which is hereby incorporated by reference herein in its entirety.

What is claimed is:

1. A photoelectric conversion device comprising:
   a pixel array including a plurality of pixel circuits arranged in a plurality of rows and a plurality of columns, each of the plurality of pixel circuits being configured to output a pixel signal based on incident light;
   a first processing circuit and a second processing circuit each including a data processing unit configured to process the pixel signal to generate data;
   an output pad;
   an output circuit configured to output the data to the outside of the photoelectric conversion device via the output pad;
   an event signal generation unit configured to generate an event signal indicating an occurrence of an event based on the pixel signal; and
   a first power supply control unit,
   wherein each of the first processing circuit and the second processing circuit includes a first power supply control target circuit, and
   wherein the first power supply control unit controls the first power supply control target circuit of the first processing circuit to be set to any one of a plurality of states including a first state and a second state in which power consumption is higher than the first state based on the event signal.

2. The photoelectric conversion device according to claim 1 further comprising a switch configured to control supply of power to the first power supply control target circuit, wherein the first power supply control unit sets the first power supply control target circuit of the first processing circuit to the first state by controlling the switch to be turned off based on the event signal, and wherein the first power supply control unit sets the first power supply control target circuit of the first processing circuit to the second state by controlling the switch to be turned on based on the event signal.

3. The photoelectric conversion device according to claim 1, wherein the first state is a state in which supply of power to the first power supply control target circuit is shut off.

4. The photoelectric conversion device according to claim 1, wherein the first power supply control target circuit includes the data processing unit.

5. The photoelectric conversion device according to claim 1, wherein the first power supply control unit controls the first power supply control target circuit of the second processing circuit to be set to any one of a plurality of states including the first state and the second state based on the event signal.

6. The photoelectric conversion device according to claim 1 further comprising:

an input pad to which a control signal from the outside of the photoelectric conversion device is input; and a second power supply control unit, wherein each of the first processing circuit and the second processing circuit further includes a second power supply control target circuit, and wherein the second power supply control unit controls the second power supply control target circuit of the first processing circuit to be set to any one of a plurality of states including the first state and the second state based on the control signal.

7. The photoelectric conversion device according to claim 6, wherein the second power supply control target circuit includes the event signal generation unit.

8. The photoelectric conversion device according to claim 6, wherein the first power supply control unit is arranged in one of the first processing circuit and the second processing circuit, and wherein the second power supply control unit is arranged in the other of the first processing circuit and the second processing circuit.

9. The photoelectric conversion device according to claim 1, wherein each of the first processing circuit and the second processing circuit includes a semiconductor element, and wherein the semiconductor element included in the first processing circuit and the semiconductor element included in the second processing circuit have the same layout in a plan view.

10. The photoelectric conversion device according to claim 9 further comprising a wiring layer including a wiring electrically connected to the semiconductor element included in the first processing circuit and a wiring electrically connected to the semiconductor element included in the second processing circuit, wherein in the plan view, the wiring in a region of the first processing circuit and the wiring in a region of the second processing circuit have layouts different from each other.

11. The photoelectric conversion device according to claim 1, wherein the event signal generation unit generates the event signal based on a difference value of the pixel signals acquired in different periods.

12. The photoelectric conversion device according to claim 11, wherein when the difference value is greater than a predetermined threshold value and the first power supply control target circuit of the first processing circuit is in the first state, the first power supply control target circuit of the first processing circuit transitions from the first state to the second state.

13. The photoelectric conversion device according to claim 11, wherein when the difference value is equal to or less than a predetermined threshold value and the first power supply control target circuit of the first processing circuit is in the second state, the first power supply control target circuit of the first processing circuit transitions from the second state to the first state.

14. The photoelectric conversion device according to claim 1 comprising a plurality of the event signal generation units, wherein the first power supply control unit is configured to control the first power supply control target circuit to transition from one of the first state and the second state to the other of the first state and the second state based on the event signal generated by at least one of the plurality of event signal generation units.

15. The photoelectric conversion device according to claim 1, wherein the first processing circuit processes a pixel signal output from a first pixel circuit among the plurality of pixel circuits, and wherein the second processing circuit processes a pixel signal output from a second pixel circuit among the plurality of pixel circuits.

16. Equipment comprising:

the photoelectric conversion device according to claim 1; and at least any one of:

an optical device adapted for the photoelectric conversion device, a control device configured to control the photoelectric conversion device, a processing device configured to process a signal output from the photoelectric conversion device, a display device configured to display information obtained by the photoelectric conversion device, a storage device configured to store information obtained by the photoelectric conversion device, and a mechanical device configured to operate based on information obtained by the photoelectric conversion device.

17. The equipment according to claim 16, wherein the processing device processes image signals that are generated by a plurality of photoelectric conversion units, respectively, and acquires distance information on a distance from the photoelectric conversion device to an object.

* * * * *